United States Patent
Yoshikawa et al.

(10) Patent No.: US 6,523,786 B2
(45) Date of Patent: Feb. 25, 2003

(54) APPARATUS FOR DETERMINING ATTITUDE OF ARTIFICIAL SATELLITE

(75) Inventors: Shoji Yoshikawa, Tokyo (JP); Katsuhiko Yamada, Tokyo (JP); Haruhiko Shimoji, Tokyo (JP); Masao Inoue, Tokyo (JP); Norimasa Yoshida, Tokyo (JP); Katsumasa Miyatake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/879,918

(22) Filed: Jun. 14, 2001

(65) Prior Publication Data

US 2002/0117585 A1 Aug. 29, 2002

(30) Foreign Application Priority Data

Feb. 27, 2001 (JP) ........................................ 2001-052803

(51) Int. Cl.[7] ................................................ B64G 1/36
(52) U.S. Cl. ...................................... 244/171; 701/222
(58) Field of Search ............................. 244/164, 171; 701/13, 222; 702/207, 208, 226; 250/230.6

(56) References Cited

U.S. PATENT DOCUMENTS

| | | | |
|---|---|---|---|
| 4,617,634 A | 10/1986 | Izumida et al. | |
| 5,412,574 A | * 5/1995 | Bender et al. | 244/164 |
| 5,935,195 A | 8/1999 | Quine | |
| 6,012,000 A | * 1/2000 | Holomes et al. | 244/171 |
| 6,102,338 A | 8/2000 | Yoshikawa et al. | |
| 6,266,616 B1 | * 7/2001 | Needleman | 244/171 |
| 6,324,475 B1 | * 11/2001 | Potteck | 701/222 |

* cited by examiner

*Primary Examiner*—Galen L. Barefoot
(74) *Attorney, Agent, or Firm*—Leydig, Voit & Mayer, Ltd.

(57) ABSTRACT

An apparatus for determining the attitude of an artificial satellite by narrowing attitude candidates to a correct one in a short time. The apparatus has star sensors, a star catalog data base, star identification sections in each of which star images output from the star sensors are collated with a star catalog with respect to each star sensor to output a group of corresponding candidates, attitude computation sections for computing a value of an attitude candidate of the artificial satellite with respect to each corresponding candidate, an attitude updating section for updating the value of the attitude candidate on the basis of the star images output from the star sensor and the star catalog, and an attitude propagation section for computing the value of the attitude candidate at the present sampling time from the value of the attitude candidate at the preceding sampling time and the artificial satellite's angular velocity. An attitude candidate unification section for comparing and combining the values of attitude candidates into one candidate is provided in a loop including the attitude updating section and the attitude propagation section.

4 Claims, 6 Drawing Sheets

APPARATUS FOR DETERMINING ATTITUDE OF ARTIFICIAL SATELLITE

CROSS REFERENCE TO RELATED APPLICATION

This application is based on Application No. 2001-052803 filed in Japan on Feb. 27, 2001, the contents of which are hereby incorporated by reference.

BACKGROUND OF THE INVENTION

1. Field of the Invention

The present invention relates to an apparatus for determining the attitude of an artificial satellite on the basis of whether stars caught by a star sensor are identified as those in a catalog of stars on the entire celestial sphere.

2. Description of the Related Art

Figure 5A:
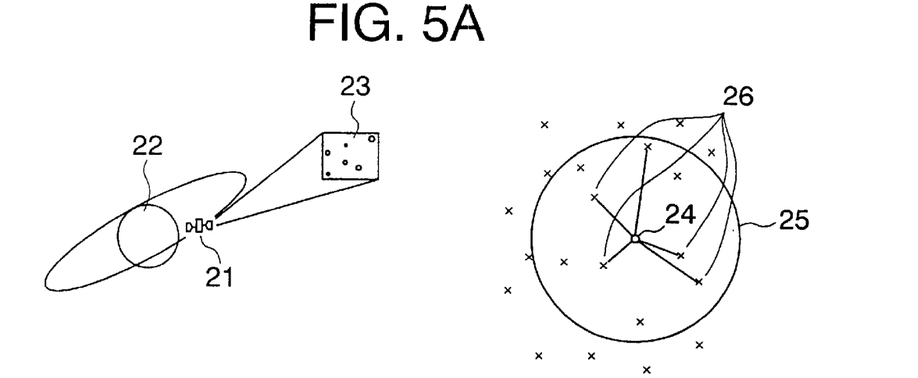
FIGS. 5A, 5B, and 5C are diagrams showing the operation and the configuration of a star identification section of a conventional artificial satellite attitude determination apparatus disclosed in Japanese Patent Application Laid-open No. 61-6100.
Figure 5B:
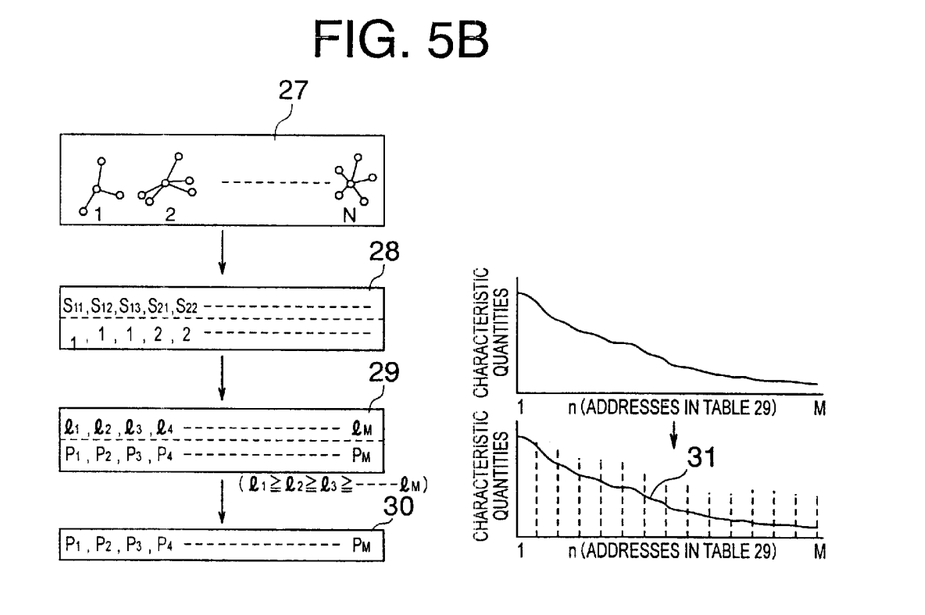
Figure 5C:
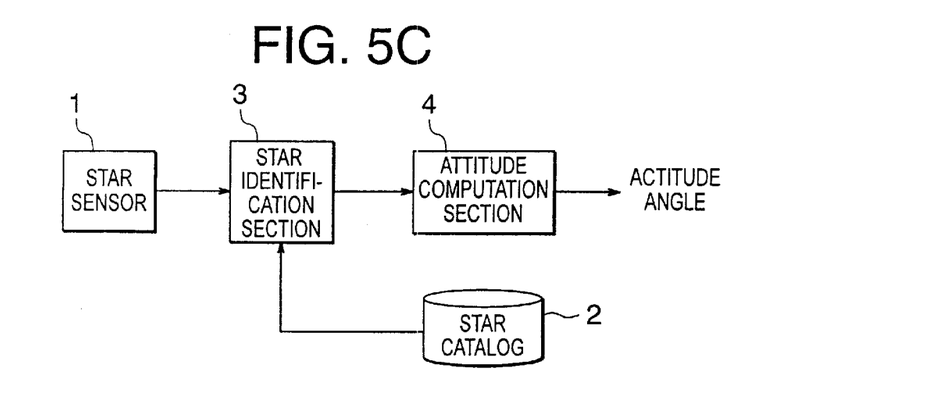

FIGS. 5A, 5B, and 5C show the operation and configuration of a star identification section of a conventional artificial satellite attitude determination apparatus which is, for example, the one disclosed in Japanese Patent Application Laid-open No. 61-6100.

The conventional artificial satellite attitude determination apparatus disclosed in the above-mentioned publication performs identification of stars as described below. As shown in FIG. 5A, an artificial satellite 21 carrying a star sensor observes a plurality of stars 23 on the celestial sphere by means of the star sensor while traveling around the earth 22. In correspondence with the maximum field of view of the star sensor, a circle 25 is made about an observed star 24 among all stars on the celestial sphere observable with the star sensor with the maximum value of a star sensor viewing angle as a radius. Stars 26 found within the circle and darker than the star 24 are sorted out and lines are radially drawn from the central star 24 to the stars 26 to form a radial line pattern. The formed radial pattern is assigned a pattern number, which is the same as the star identification number of the star 24.

Thereafter, as shown in FIG. 5B, a set 27 of patterns is prepared in this manner from the stars on the entire celestial sphere, and a table 28 is formed from the set 27 of patterns by combining characteristic quantities and the pattern numbers of all the patterns. Another table 29 is formed in which the characteristic quantities and the pattern numbers are arranged in the descending order of the magnitudes of the characteristic quantities of the table 28. A function 31 of addresses in the table 29 is formed for approximations to the characteristic quantities. A pattern number table 30 is also prepared which contains only the pattern numbers in the table 29. A star identification process is as described below. A pattern is generated in the above-described manner about a star which is brightest in image data obtained through observation with the star sensor. The pattern is compared with the function 31 to extract a matching portion from a corresponding sub-table of the table 30. Extraction of only one matching portion is regarded as a success in identification.

FIG. 5C shows the configuration of an apparatus for determining the attitude of an artificial satellite on the basis of the results of determination as to whether stars caught by a star sensor are identified as those on a catalog of stars on the entire celestial sphere. Image data obtained through observation with a star sensor 1 is compared with a pattern formed on the basis of a star catalog 2 by a star identification section 3. Occurrence of only one match is recognized as a success in identification. If the result is only one match, an attitude is uniquely computed from the identification result by an attitude computation section 4, thereby completing initial attitude acquisition.

Figure 6:
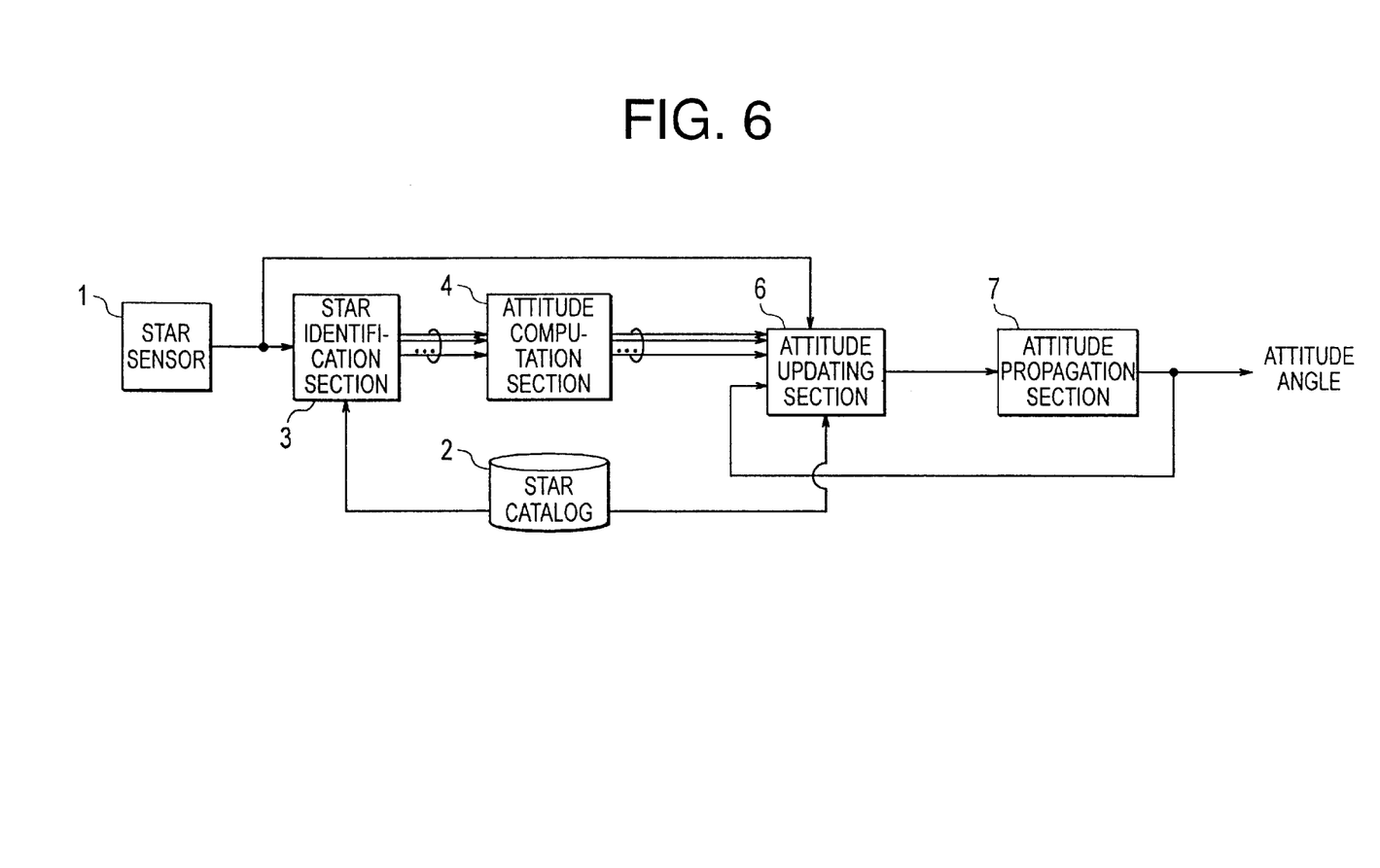
FIG. 6 is a block diagram showing the configuration of another conventional artificial satellite attitude determination apparatus.

FIG. 6 is a block diagram showing the configuration of another conventional apparatus for determining the attitude of an artificial satellite. In FIG. 6, the components identical or corresponding to those of the conventional apparatus shown in FIG. 5C are indicated by the same reference numerals. The description for the corresponding components will not be repeated. As new reference numerals, reference numeral 6 indicates an attitude updating section for updating the values of attitude candidates on the basis of star images output from the star sensor 1 and a star catalog stored in the star catalog data base 2, and reference numeral 7 indicates an attitude propagation section for computing the values of an attitude candidate at the present sampling time from the values of an attitude candidate and the satellite body angular velocity at the preceding sampling time.

In the artificial satellite determination apparatus arranged as shown in FIG. 6, a star can be identified even when the number of stars in the field of view of the star sensor 1 imaged at one time is smaller than the number necessary for identification. Also, a plurality of attitude angle candidates are prepared in the star identification section 3 and the attitude computation section 4, and as star images are obtained by repeating image pickup with the star sensor 1, those impossible as a candidate for a solution are removed by the attitude updating section 6. In this apparatus, therefore, it is not necessary to devise a special method for extracting characteristic quantities in the star identification section 3.

However, the above-described conventional artificial satellite attitude determination apparatus shown in FIG. 5 is arranged to narrow corresponding candidates down to one in the star identification section 3 and to use only one solution in the attitude computation section 4 and in the other subsequent sections. To do so, it is necessary to devise a special method for extracting characteristic quantities such that comparison of only one frame of star image in the field of view of one star sensor at a time point suffices for completion of identification. Moreover, there are other restrictions such that it is necessary to increase the field of view of the star sensor 1 to such a sufficiently large extent as to always cover the necessary number of stars for identification, or identification at the time point is abandoned when the number of stars falling into the field of view is insufficient.

In the above-described conventional artificial satellite attitude determination apparatus shown in FIG. 6, the process of narrowing down candidates by removing impossible ones requires a considerably long time for narrowing down to one candidate.

SUMMARY OF THE INVENTION

In view of the above-described circumstances, an object of the present invention is to provide an artificial satellite attitude determination apparatus capable of narrowing attitude candidates down to a correct one in a short time.

In order to attain the above-mentioned object, according to one aspect of the present invention, there is provided an apparatus for determining the attitude of an artificial satellite comprising one or a plurality of star sensors, a star catalog data base in which information on each of stars in an inertial coordinate system is stored, a star identification section in which star images output from the star sensors are collated with a star catalog in the star catalog data base with respect to each star sensor to output a group of corresponding candidates, an attitude computation section for computing a value of an attitude candidate of the artificial satellite with respect to each corresponding candidate, an attitude updating section for updating the value of the attitude candidate on the basis of star images output from the star sensor and the star catalog, an attitude propagation section for computing the value of the attitude candidate at the present sampling time from the value of the attitude candidate at a preceding sampling time and the artificial satellite body angular velocity, and an attitude candidate unification section for comparing the values of a plurality of attitude candidates to combine the same into one, the attitude candidate unification section being provided in a loop formed by the attitude updating section and the attitude propagation section.

Also, the attitude candidate unification section compares the value of the attitude candidate computed by the attitude computation section at the present sampling time and the value of the attitude candidate obtained by propagating the attitude candidate obtained by being computed in the past and by being propagated to the present sampling time by using the satellite body angular velocity at the corresponding sampling time to combine the attitude candidates into one.

Further, the attitude candidate unification section compares the attitude candidate computed from one of the star sensors with the attitude candidate computed from another of the star sensors to combine the attitude candidates into one.

Furthermore, the attitude updating section predicts star images on the star sensor screen and also star images on the other star sensor screen with respect to each of the attitude candidates on the basis of the star catalog, verifies the star images by comparison with star image data output from the corresponding star sensor, and eliminates those in the attitude candidates apparently different from the star image data.

DETAILED DESCRIPTION OF THE PREFERRED EMBODIMENTS

Embodiment 1

Figure 1:
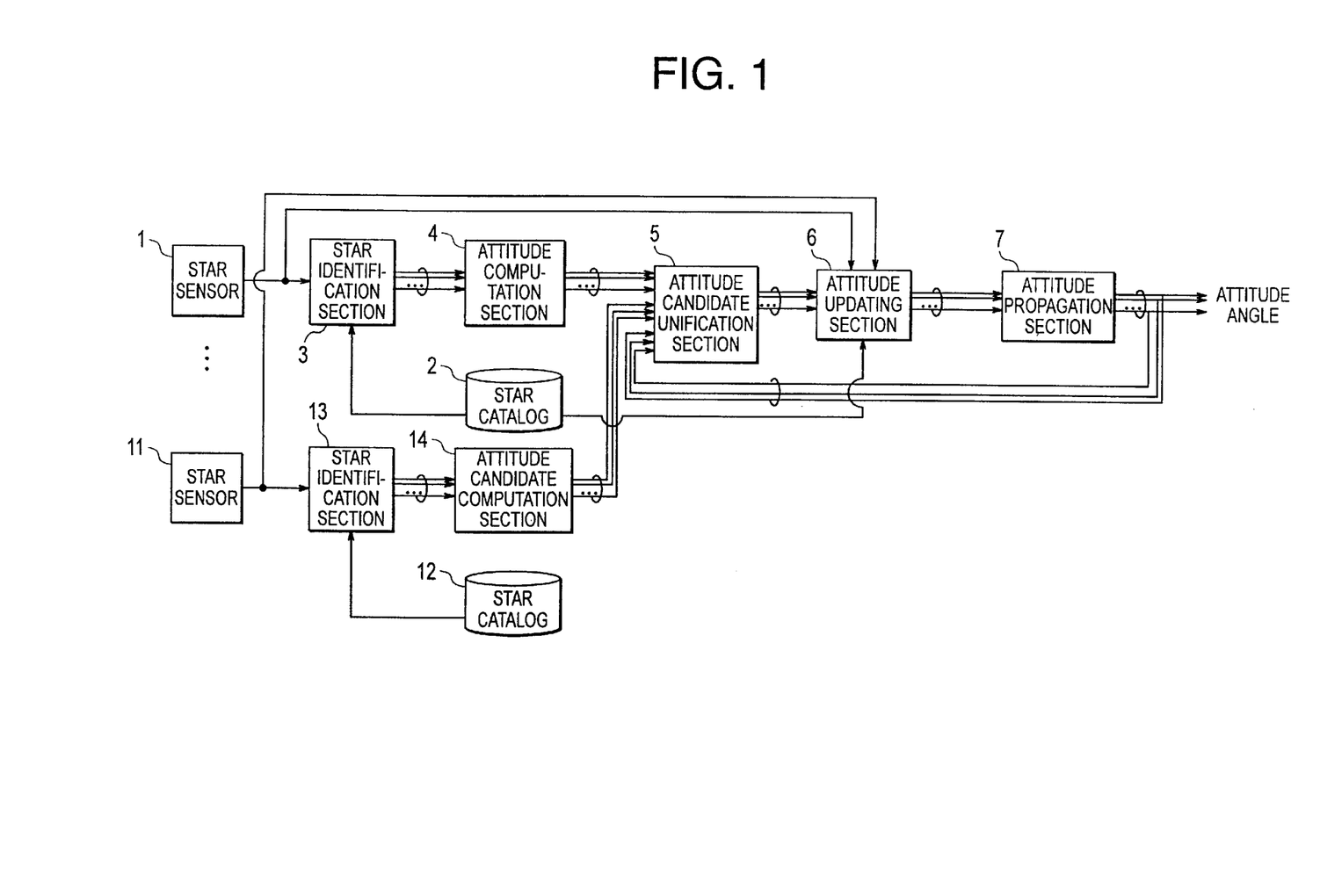
FIG. 1 is a block diagram showing an artificial satellite attitude determination apparatus in Embodiment 1 of the present invention.

FIG. 1 is a block diagram showing an apparatus for determining the attitude of an artificial satellite in Embodiment 1 of the present invention.

Referring to FIG. 1, the artificial satellite attitude determination apparatus is provided with a star sensor 1, a star catalog data base (hereinafter referred to simply as a star catalog) 2 in which information on each of stars in an inertial coordinate system is stored, a star identification section 3 for comparing a star image output from the star sensor 1 with portions of the star catalog 2 stored in the star catalog data base to output a group of corresponding candidates, and an attitude computation section 4 for computing the values of candidates for the attitude of the artificial satellite with respect to the corresponding candidates.

The artificial satellite attitude determination apparatus is also provided with an attitude candidate unification section 5 for combining a plurality of attitude candidates into one by comparing them with each other, an attitude updating section 6 for updating the values of attitude candidates on the basis of star images output from the star sensor and the star catalog, an attitude propagation section 7 for computing the value of an attitude candidate at the present sampling time from the values of an attitude candidate and the satellite body angular velocity at the preceding sampling time, a star sensor 11 different from the star sensor 1, a star catalog 12 different from the star catalog 2, a star identification section 13 different from the star identification section 3, and an attitude computation section 14 different from the attitude computation section 4. A common program code may be used for the star catalog 2, the star identification section 3 and the attitude computation section 4.

The operation of the above-described apparatus will now be described. The star sensor 1 outputs an image of the celestial sphere within its field of view at each of sampling times. An image processing section (not shown) extracts star images from the image output from the star sensor 1, and outputs star image data such as data on the center position and the brightness of each star image. The star identification section 3 compares the distances between the picked-up star images, the brightnesses of the star images with the distances between fixed stars and the brightnesses of the fixed stars registered in the star catalog 2 to find the correspondence between the picked-up star images and the fixed stars entered in the star catalog 2.

If the number of stars observable in the field of view of the star sensor 1 is not sufficiently large, or if planets, temporary bright points due to space radiation, debris or the like other than the fixed stars are imaged on the sensor screen, it is difficult to narrow corresponding candidates down to one. In particular, in a case where a low-priced component is used as the star sensor 1, it is necessary to set lower criteria for verification by comparison, so that the possibility of a plurality of candidates being left is high. If a plurality of candidates are left, all of them are output.

The attitude computation section 4 computes candidates for the attitude of the artificial satellite in inertial space from the corresponding candidates obtained by the star identification section 3. Since there are a plurality of star image correspondences, the attitude computation section 4 also computes a plurality of attitude candidates.

The operations of the star sensor 11, the star identification section 13 and the attitude computation section 14 are the same as those of the star sensor 1, the star identification section 3 and the attitude computation section 4.

In the attitude candidate unification section 5, the values of the attitude candidates are compared with each other. It must be that correct attitude candidates coincide with each other with tolerance depending on to detection errors, catalog errors and alignment errors. If there are such correct candidates close to each other, they are recognized as correct, the values of the attitude candidates are narrowed down to one, and an initial attitude acquisition completion flag is set. Initial capture is thus completed. In a case where there is only one or no attitude candidate or there are no attitude candidates coinciding with each other, the group of attitude candidates is output without being reduced.

Subsequently, in the attitude updating section 6, star image data obtained at the present sampling time and a state of fixed stars predicted from the determined value of the attitude value on the basis of the star catalog 2 are compared and the determined attitude value is updated so to be closer to the star image data.

In the attitude propagation section 7, the determined attitude value is propagated in combination with attitude angular velocity information until the next sampling time. At the next sampling time, star images are extracted from the image output from the star sensor 1, and the determined attitude value is updated in the attitude updating section 6. This process is repeatedly performed.

In Embodiment 1, as described above, the attitude candidate unification section 5 is provided in the processing loop formed by the attitude updating section 6 and the attitude propagation section 7 to enable attitude candidates to be narrowed down to one even if the attitude candidates cannot be narrowed down to one in the star identification section, thus avoiding erroneous attitude determination even when some objects other than fixed stars are imaged on the sensor screen.

Since there is no need to narrow corresponding candidates down to one in the star identification section, requirements in terms of star image detection accuracy of the star sensor can be moderated.

Embodiment 1 has been described with respect to a case where there is no information about the attitude of the artificial satellite. However, if information from some of other attitude sensors such as a sun sensor and an earth sensor can be used, or if attitude values determined in the past can be used, the range of search of the star catalog 2 in the star identification section 3 can be limited to improve the facility with which correspondences with fixed stars are narrowed down to one.

If no suitable correspondence with star image data can be recognized in the attitude updating section 6, the determined attitude value may be regarded as incorrect and the initial attitude acquisition process may be again performed.

Embodiment 2

Figure 2:
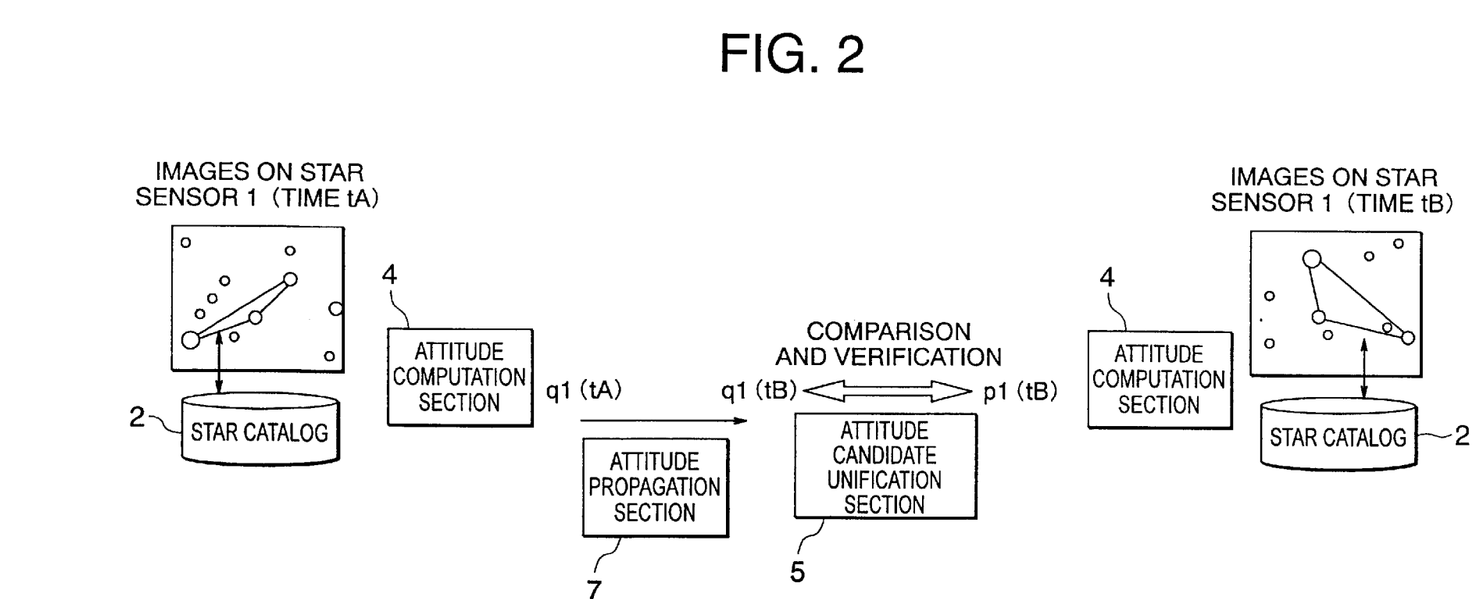
FIG. 2 is a block diagram showing an artificial satellite attitude determination apparatus in Embodiment 2 of the present invention.

FIG. 2 is a diagram for explanation of an artificial satellite attitude determination apparatus in Embodiment 2 of the present invention, in which the relationship among the attitude computation section 4, the attitude candidate unification section 5 and the attitude propagation section 7 shown in FIG. 1 is clarified through a more concrete example thereof.

In FIG. 2, the components identical or corresponding to those of Embodiment 1 shown in FIG. 1 are indicated by the same reference numerals. The description for the corresponding components will not be repeated.

The operation of this embodiment will now be described. Referring to FIG. 2, the attitude candidate unification section 5 is also supplied with the output from the attitude propagation section 7 as well as the output from the attitude computation section 4. In attitude candidate comparison and verification, a value $p1(tB)$ of an attitude candidate computed at the present sampling time tB and the value of another attitude candidate $q1(tB)$ are compared for verification, the attitude candidate $q1(tB)$ being converted from an attitude candidate $q1(tA)$ computed at a past sampling time tA to be obtained as a value at the present sampling time tB, the attitude candidate $q1(tA)$ being repeatedly propagated through the attitude propagation section 7 at every sampling cycle.

In Embodiment 2, as described above, the output from the attitude propagation section 7 is added to the input to the attitude candidate unification section 5. Thus, even in a case where attitude candidates obtained at one sampling time cannot be narrowed down to one, they can be stored as data and used in comparison between attitude candidates in the attitude candidate unification section at the next sampling time or afterward, thereby achieving reliable correct attitude determination.

Determined attitude values computed in the past may be used in such a manner that they are not only propagated simply at an angular velocity but also reformed into more accurate determined values through updating from star image data and the star catalog in the attitude updating section 6.

It is not necessary to perform updating in the attitude updating section 6 at every sampling time, because the effect of updating is increased with the shift of the field of view of the sensor. Further, updating may be performed successively with respect to one of attitude candidates instead of being performed with respect to all the attitude candidates at a time. This updating method is effective in reducing the computation time.

Embodiment 3

Figure 3:
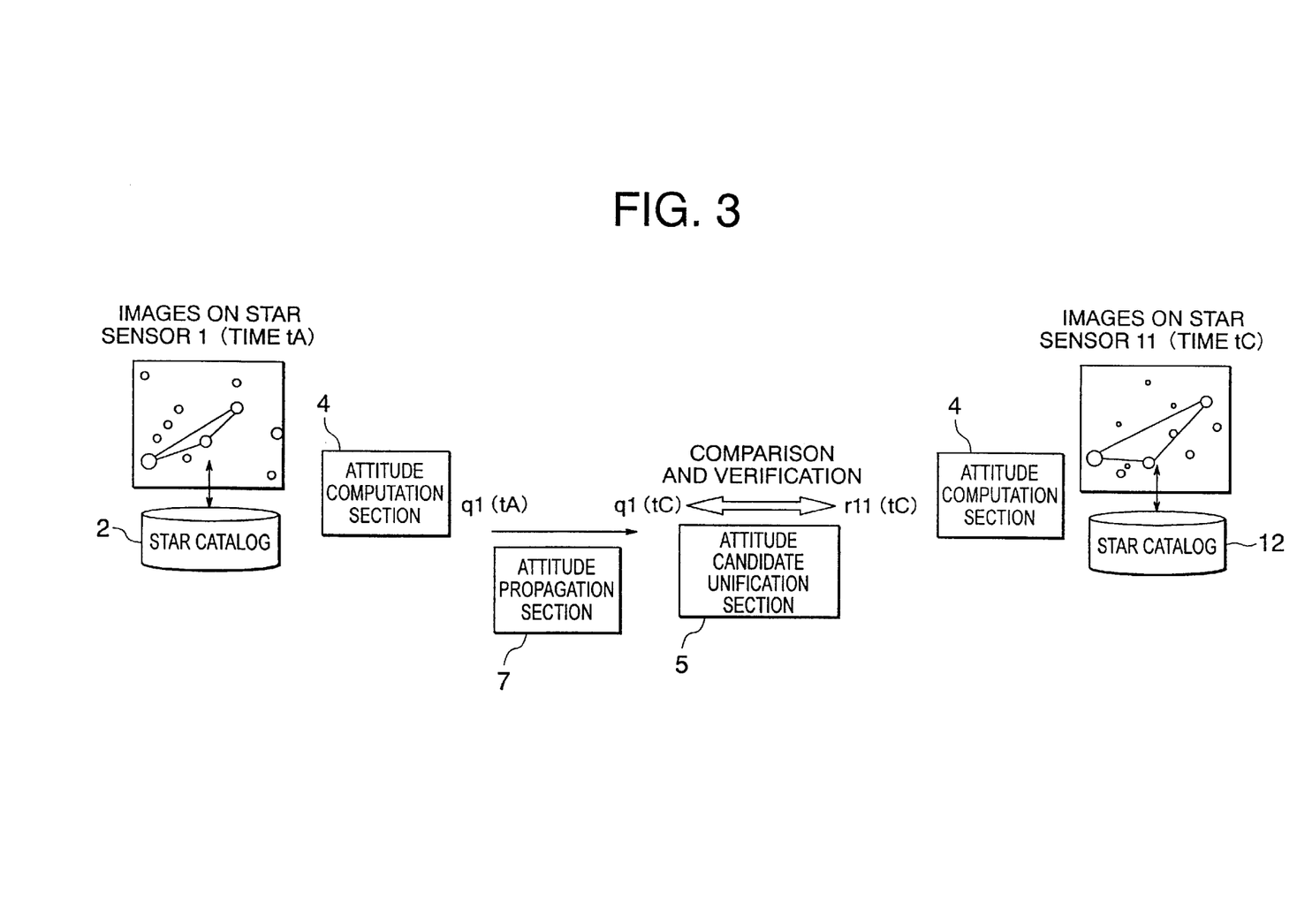
FIG. 3 is a block diagram showing an artificial satellite attitude determination apparatus in Embodiment 3 of the present invention.

FIG. 3 is a diagram for explanation of an artificial satellite attitude determination apparatus in Embodiment 3 of the present invention, in which the relationship among the attitude computation section 4, the attitude candidate unification section 5, the attitude propagation section 7, and the attitude computation section 14 shown in FIG. 1 is clarified through a more concrete example thereof.

In FIG. 3, the components identical or corresponding to those in Embodiment 1 shown in FIG. 1 are indicated by the same reference numerals. The description for the corresponding components will not be repeated.

The operation of this embodiment will now be described. The star identification section 3 (not shown) obtains a correspondence between an image output from the star sensor 1 at a time tA with fixed stars registered in the star catalog 2 on the basis of star image data extracted from the image output from the star sensor 1. The attitude computation section 4 computes, from this correspondence, an attitude $q1(tA)$ of the artificial satellite relative to inertial space. On the other hand, the star identification section 13 (not shown) obtains a correspondence between an image output from the star sensor 11 at a time tC with fixed stars registered in the star catalog 12 on the basis of star image data extracted from the image output from the star sensor 11.

The attitude computation section 14 computes, from this correspondence, an attitude $r11(tC)$ of the artificial satellite relative to inertial space.

The attitude candidate unification section 5 performs attitude candidate comparison and verification by comparing the value of the attitude candidate $r11(tC)$ computed at the present sampling time tC with the value of an attitude candidate $q1(tC)$ converted from an attitude candidate $q1(tA)$ computed at a past sampling time tA to be obtained as a value at the present sampling time tC, the attitude candidate q1(tA) being repeatedly propagated through the attitude propagation section 7 at every sampling cycle.

In Embodiment 3, as described above, a comparison with an attitude candidate from the other star sensor is made in the attitude candidate unification section 5. When a plurality of attitude candidates recognized as equally probable exist in the field of view of one sensor, they are compared with those obtained from the field of view of another sensor to thereby select more probable attitude candidates.

In the process of extracting star image data from one star sensor, computing attitude candidates and performing comparison and verification, data from the other star sensor is not used. Therefore, some or all of the four kinds of processing: extraction of star image data, identification, computation of attitude candidates, and verification of the attitude candidates can be executed by another computer to use only the results of the processing. Such distributed processing enables limitation of the increase in the computer load in the attitude determination apparatus even in a case where the number of star sensor is large.

The embodiments have been described by assuming that the sampling times of a plurality of star sensors are synchronized. Needless to say, even when the sampling times are asynchronous, it is possible to achieve the same effect by propagating each of attitude candidate at a time point at which the attitude candidate is to be evaluated in combination with an estimated value of the satellite body angular velocity.

Embodiment 4

Figure 4:
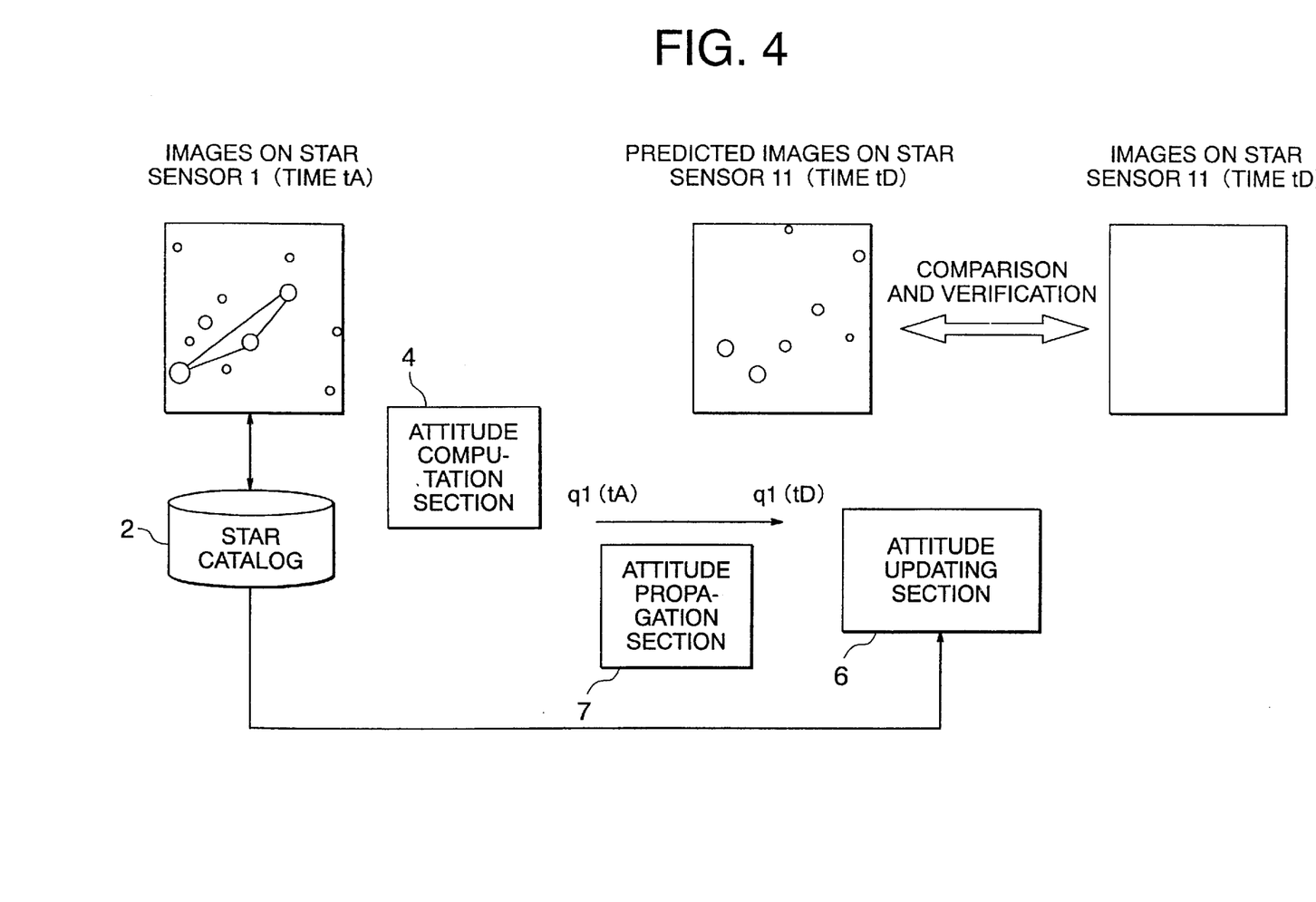
FIG. 4 is a diagram showing an artificial satellite attitude determination apparatus in Embodiment 4 of the present invention.

FIG. 4 is a diagram for explanation of an artificial satellite attitude determination apparatus in Embodiment 4 of the present invention, in which the relationship among the attitude computation section 4, the attitude updating section 6 and the attitude propagation section 7, and the star sensors shown in FIG. 1 is clarified through a more concrete example thereof.

In FIG. 4, the components identical or corresponding to those in Embodiment 1 shown in FIG. 1 are indicated by the same reference numerals. The description for the corresponding components will not be repeated.

The star identification section 3 (not shown) obtains a correspondence between an image output from the star sensor 1 at a time tA with fixed stars registered in the star catalog 2 on the basis of star image data extracted from the image output from the star sensor 1. The attitude computation section 4 computes an attitude q1(tA) of the artificial satellite relative to inertial space from this correspondence. On the other hand, star image data is extracted from an image output from the star sensor 11 at a time tD.

The attitude updating section 6 predicts an observed state of fixed stars in the field of view of the star sensor 11 on the basis of the star catalog 2 from the value of an attitude candidate q1(tD) obtained in such a manner that the attitude candidate q1(tA) computed at the past sampling time tA is repeatedly propagated through the attitude propagation section 7 at every sampling cycle and converted into a value at the present sampling time tD. The attitude updating section 6 verifies the predicted state by comparison with the obtained star image, and eliminates candidates regarded as apparently wrong by referring to the closeness of the prediction to the star image data.

In Embodiment 4, as described above, the attitude updating section 6 performs verification also by comparison with a star image output from the other star sensor and eliminates candidates apparently wrong. When a plurality of attitude candidates recognized as equally probable exist in the field of view of one sensor, they are compared with those obtained from the field of view of another sensor. In this manner, probable attitude candidates can be separated from those not so probable, those apparently wrong being eliminated, thus narrowing down the number of candidates.

In the process of extracting star image data from one star sensor, computing attitude candidates and performing comparison and verification, data from the other star sensor is not used. Therefore, some or all of the three kinds of processing: extraction of star image data, identification, and computation of attitude candidates can be executed by another computer to use only the results of the processing. Such distributed processing enables limitation of the increase in the computer load in the attitude determination apparatus even in a case where the number of star sensor is large.

The embodiments have been described by assuming that the sampling times of a plurality of star sensors are synchronized. Needless to say, even when the sampling times are asynchronous, it is possible to achieve the same effect by propagating each of attitude candidate at a time point at which the attitude candidate is to be evaluated in combination with an estimated value of the satellite body angular velocity.

The gist of the present invention is as summarized below.

According to the present invention, a plurality of candidates are allowed to remain in the star identification section. In the star identification section, therefore, computation of a plurality of attitude candidates may be first performed by using simple characteristic quantities such that, for example, a triangle is formed by three star images and the lengths of the sides of this triangle are compared with those of each triangle formed by three stars registered in the star catalog. It is not necessary to devise any special method for extracting characteristic quantities.

As means for completing initial attitude acquisition by narrowing attitude candidates down to one, there are provided four means: the means for comparing and verifying each of attitude candidates with star image data to eliminate candidates not related; the means for narrowing a plurality of attitude candidates obtained in one frame of image down to one with reference to closeness; the means for narrowing a plurality of attitude candidates down to one in such a manner that an attitude candidate obtained in a past image is propagated with time to be compared with attitude candidates obtained in the present image with reference to closeness; and the means for narrowing a plurality of attitude candidates down to one by also performing comparison with attitude candidates obtained by another star sensor with reference to closeness.

Therefore, even if the number of stars within the field of view is smaller than the number necessary for identification, each of attitude candidates can be verified by being compared with star image data to eliminate attitude candidates not related, and it is also possible for the apparatus to wait for the necessary number of stars falling into the field of view while propagating attitude candidates with time. Also, attitude candidates obtained by another star sensor are also utilized, so that, even when the number of stars in the field of view of one star sensor is not sufficiently large, identification is possible if the number of stars in the field of view of the other star sensor is sufficiently large.

Also, according to the present invention, an attitude candidate unification section is added to narrow a plurality of attitude candidates down to one with reference to closeness. Further, star image data output from a plurality of star sensors and attitude candidates computed from the image data are used. Therefore, a plurality of candidates can be narrowed down to a correct one in a short time.

According to the present invention, as described above, the attitude candidate unification section for comparing the values of a plurality of attitude candidates to combine the same into one is provided in the loop formed by the attitude updating section and the attitude propagation section, thereby ensuring that when a plurality of attitude candidates equally probable remain in the star identification section at a stage at which the attitude of the artificial satellite is undetermined, i.e., an initial attitude acquisition stage, the attitude candidate unification section can determine one attitude candidate by recognizing that those close to each other in the attitude candidates are most probable.

The above-described attitude candidate unification section is arranged to compare the value of an attitude candidate computed by the attitude computation section at the present sampling time with the values of attitude candidates obtained by being computed in the past and by being propagated to the present sampling time by using satellite body angular velocities at the respective sampling times to combine the attitude candidates into one. Therefore, even in a case where only one attitude candidate is obtained at the present sampling time and the probability cannot be confirmed at the stage of initially capturing the attitude of the artificial satellite, the correct attitude can be determined with reliability by comparison with attitude candidates obtained in the past.

The above-described attitude candidate unification section is arranged to compare attitude candidates computed from one star sensor and attitude candidates computed from another star sensor to combine the same into one. Therefore, attitude candidates computed from the other star sensor simultaneously or in the past can also be used in the attitude candidate unification section at the stage of initially capturing the attitude of the artificial satellite, thereby further improving the reliability of determination of the correct attitude.

Further, the above-described attitude candidate unification section is arranged to predict star images on the star sensor screen associated with it and also star images on the other star sensor screen with respect to each of the attitude candidates on the basis of the star catalog, to verify them by comparison with the star image data output from the corresponding star sensor, and to eliminate those in the attitude candidates apparently different from the star image data. Therefore, when a plurality of attitude candidates equally probable as seen in the field of view of one sensor exist at the stage of initially capturing the attitude of the artificial satellite, they are compared with those in the field of view of another sensor, thus enabling the truly probable attitude candidate to be separated from those not so probable.

What is claimed is:

1. An apparatus for determining the attitude of an artificial satellite comprising:

at least one star sensor;

a star catalog data base in which information on each of stars in an inertial coordinate system is stored;

a star identification section in which star images output from the star sensor are collated with a star catalog in the star catalog data base, with respect to each star sensor, and which outputs a group of corresponding star image candidates;

an attitude computation section computing a value of an attitude candidate of the artificial satellite with respect to each corresponding star image candidate;

an attitude candidate unification section comparing the values of the attitude candidates, recognizing attitude candidates that agree within a tolerance, thereby indicating correct attitude candidates, and unifying the attitude candidates that agree within the tolerance into a single attitude candidate indicating correct attitude of the artificial satellite;

an attitude updating section directly communicating with the star sensor and the attitude candidate unification section and updating the value of each attitude candidate based on star images output from the star sensor and the star catalog; and an attitude propagation section for computing the value of an attitude candidate at a present sampling time from the value of the corresponding attitude candidate at a preceding sampling time and angular velocity of the artificial satellite, wherein the attitude candidate unification section, the attitude updating section, and the attitude propagation section are connected in a processing loop for reducing number of attitude candidates compared to obtain the correct attitude of the artificial satellite.

2. The apparatus according to claim 1, wherein the attitude candidate unification section compares the value of each attitude candidate computed by the attitude computation section at a present sampling time and the value of the corresponding attitude candidate obtained by propagating an attitude candidate computed in a past sampling time to the present sampling time, using the angular velocity of the artificial satellite at the corresponding sampling time, in unifying the attitude candidates that agree within the tolerance into the single attitude candidate indicating the correct attitude of the artificial satellite.

3. The apparatus according to claim 1, including a plurality of star sensors, wherein the attitude candidate unification section compares an attitude candidate computed from a first of the star sensors with an attitude candidate computed from a second of the star sensors in unifying the attitude candidates that agree within the tolerance into the single attitude candidate indicating the correct attitude of the artificial satellite.

4. The apparatus according to claim 1, wherein the attitude updating section predicts star images with respect to each of the attitude candidates based on the star catalog, verifies the star images by comparison with star image data output from the corresponding star sensor, and eliminates attitude candidates different from the star image data.

* * * * *